Figure 1:
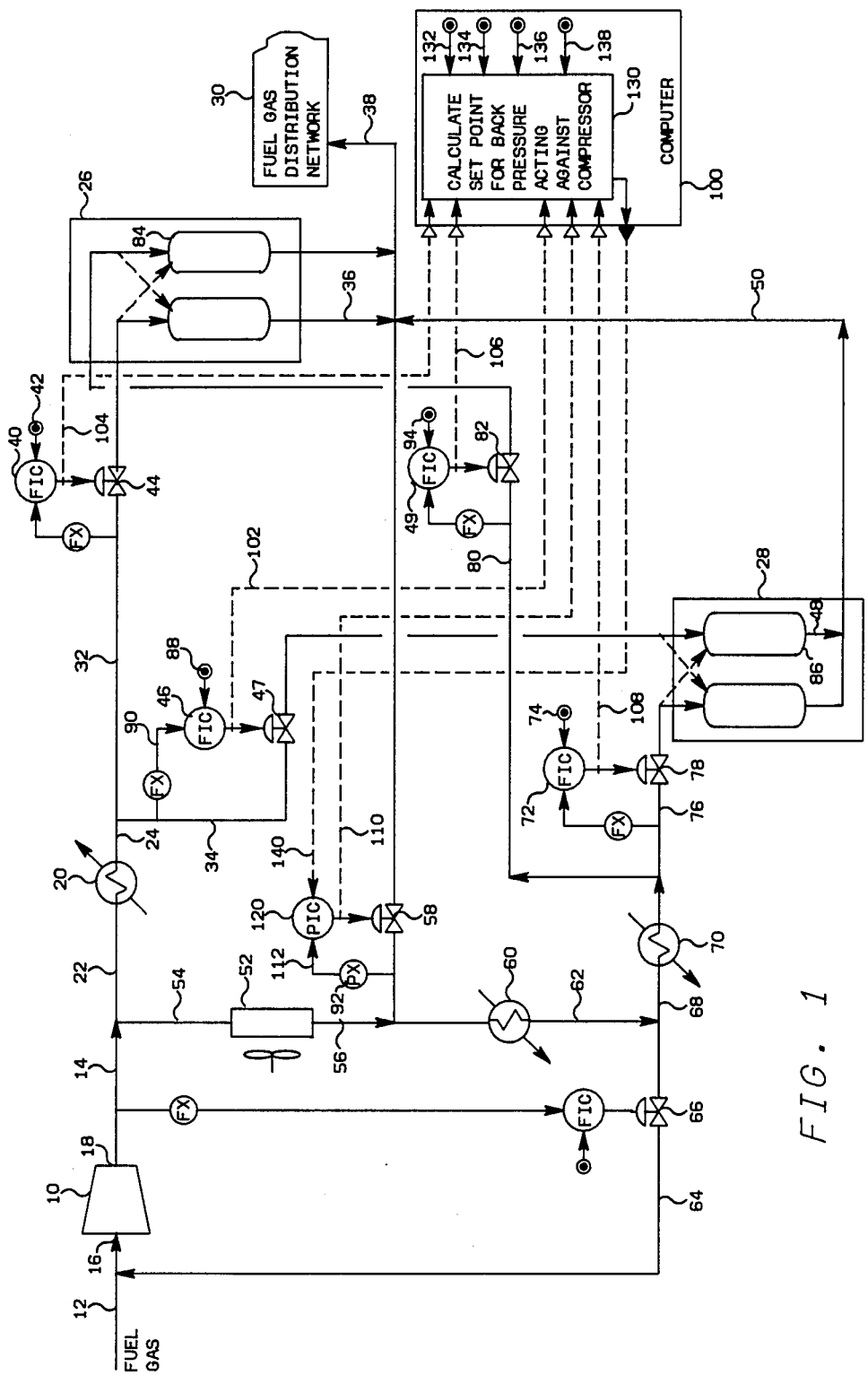

United States Patent [19]

Stengle et al.

[11] Patent Number: 4,717,396
[45] Date of Patent: Jan. 5, 1988

[54] FLOATING PRESSURE CONTROL FOR A GAS DISTRIBUTION SYSTEM

[75] Inventors: Nancy K. Stengle; James W. Hobbs, both of Sweeny, Tex.

[73] Assignee: Phillips Petroleum Company, Bartlesville, Okla.

[21] Appl. No.: 907,948

[22] Filed: Sep. 15, 1986

[51] Int. Cl.$^4$ .............................................. B01D 53/04
[52] U.S. Cl. .......................................... 55/20; 55/21; 55/28; 55/160; 55/179; 55/208; 55/387; 137/110; 137/118
[58] Field of Search .................... 55/18, 20, 21, 28, 33, 55/35, 62, 160, 179, 208, 387; 137/110, 118

[56] References Cited

U.S. PATENT DOCUMENTS

| Re. 29,383 | 9/1977 | Gallatin et al. | 137/110 X |
|---|---|---|---|
| 2,601,849 | 7/1952 | Lee, II | 137/118 X |
| 2,629,460 | 2/1953 | Maki | 137/110 X |
| 3,230,688 | 1/1966 | Kitchen et al. | 55/21 X |
| 3,257,772 | 6/1966 | Maddox et al. | 55/21 X |
| 3,322,136 | 5/1967 | Matta | 137/118 |
| 3,380,650 | 4/1968 | Drummond et al. | 230/114 |
| 3,766,713 | 10/1973 | Leonard | 55/21 |
| 3,856,486 | 12/1974 | Chang | 137/110 X |
| 3,967,637 | 7/1976 | Jackson | 137/110 |
| 3,972,342 | 8/1976 | Jackson | 137/110 |
| 4,239,053 | 12/1980 | Cornell | 137/110 |
| 4,392,877 | 7/1983 | Funk | 62/37 |
| 4,434,746 | 3/1984 | Stewart | 122/448 |

FOREIGN PATENT DOCUMENTS 18086  2/1981  Japan .................... 137/118

*Primary Examiner*—Robert Spitzer
*Attorney, Agent, or Firm*—George E. Bogatie

[57] ABSTRACT

In a process in which a compressor feeds gas to a manifold which in turn supplies a controlled flow of gas to each of a plurality of users in parallel operation, method and apparatus are provided for controlling the back pressure acting against the compressor. The back pressure is manipulated to substantially optimize operation of the compressor. Since user demand for the gas varies over wide ranges, the control system automatically reduces back pressure acting against the compressor during periods of low loads by incrementally opening the control valve to one of the plurality of users. The reduced back pressure causes each on line control valve to move toward a more open position to maintain its set point. The pressure reduction continues in increments until one of the plurality of on line control valves reaches a maximum desired open position. The condition of a control valve exceeding a maximum desired open position is also sensed and the back pressure is then increased to cause the plurality of valves to move toward a closed position. The pressure increase cycle continues until all on line valves achieve a position less than the high limit. At this time the decrease/increase pressure is repeated so that the actual back pressure is floating, being dependent on user demand for the gas.

17 Claims, 1 Drawing Figure

FLOATING PRESSURE CONTROL FOR A GAS DISTRIBUTION SYSTEM

This invention relates to process control. In one aspect it relates to method and apparatus for controlling a gas distribution system in which a gas is compressed for transmission to a plurality of adsorbent type dryers for regenerating the beds of adsorbent material in the dryers, and then further transmitted to a distribution network for utilization as a fuel gas.

Dryers are used in many applications to remove moisture and other impurities such as CO2 from gases. Such dryers are typically of the type employing a solid bed of adsorbent material. In one type of process which is employed in hydrogen purification the impurity is adsorbed at a low temperature and later desorbed thermally by raising the temperature and passing a non-adsorbable purge gas through the bed to aid in desorbtion and to carry the desorbed gases from the bed. This adsorbent bed regeneration step, which is carried out at an elevated temperature, is typically followed by a step in which the adsorbent bed is cooled prior to returning the bed to on stream conditions. For continuous operation two beds are necessary, while one bed is on stream the second is being regenerated.

In the past a system for compressing a gas which could be utilized as a purge gas for regenerating an adsorbent bed and then further utilized at a pressure sufficient for distribution in a fuel gas network required an artifically high pressure for transmitting the compressed gas through the distribution network. This is because in the above described process one compressor is feeding a fluid into a manifold which in turn feeds several separate users in parallel operation. In the described system the gas flow required for regenerating a dryer and/or for cooling a dryer is on set point control based on the requirements of the particular dryer. Therefore flow demand for the dryer operation can vary over wide ranges depending on the number of dryers being purged with heated fuel gas, and the number of dryers being cooled with cool fuel gas at any one time. In addition, a minimum pressure must be maintained for satisfactory operation of the fuel gas distribution network. While the practice of maintaining a pressure at the discharge outlet of the compressor which at all times could handle a peak volume demand while maintaining at least a minimum outlet discharge pressure provides satisfactory operation, it is wasteful of energy required for driving the compressor at a time when the actual demand for the regeneration gas is less than the peak demand.

It is therefore an object of this invention to reduce the back pressure acting against the compressor and correspondingly reduce the discharge outlet pressure of the compressor. It is a further object of this invention to control the discharge outlet pressure to prevent needless compression of gas and needless usage of energy for driving a compressor. It is a still further object of this invention to automatically move the control valves that manipulate flow from a compressed gas supply manifold toward a fully opened position, until at least one valve reaches a high limit for the open position.

In accordance with the present invention method and apparatus are provided wherein a set point for a back pressure control valve acting against the discharge outlet pressure of a compressor is periodically increased or decreased by an incremental amount based on the position of a plurality of control valves. The control action of reducing the pressure set point requires that a control valve manipulating flow, for example hot regeneration gas to a dryer, move toward a fully open position to maintain its set point flow rate. This pressure reduction process continues until one of the plurality of control valves reaches a maximum desired open position e.g. 90% open. The condition of a control valve reaching the high limit for open position is sensed and in response to this condition the pressure is increased. The control action of increasing the back pressure set point requires that a control valve move toward a closed position to maintain its set point flow rate. This pressure increase process continues until all of the plurality of control valves are at a position less open than the high limit for open position.

At this time the increase/decrease pressure cycle is repeated so that the actual discharge outlet pressure of the compressor is floating i.e., the actual pressure is determined by the deviation of the valve positions from the high limit for open position. Essentially in this control action small incremental changes are periodically repeated to automatically move the position of the plurality of control valves toward a fully open position until at least one control valve is at a high limit for open position or until a low limit for discharge outlet pressure, which would adversely affect operation of the fuel gas distribution network, is encountered. In this manner the discharge outlet pressure is set at a pressure which results in a substantial optimization of the gas compression system while still maintaining sufficient pressure to satisfy the demands of the processes being served. This results in significant economic benefits in operation of the fuel gas compressor.

Other objects of the invention will be apparent from the foregoing brief description of the invention and the claims as well as the brief description of the drawings which are briefly described as follows:

FIG. 1 is a diagrammatic illustration of a fuel gas distribution system and the associated control system of the present invention.

The invention is illustrated and described in terms of a specific gas distribution system in which a fuel gas is compressed for utilization as a purge gas for a dryer with further utilization as a combustible fuel. However the invention is applicable to any system in which a compressor feeds a fluid into a manifold which in turn feeds several separate users with each user drawing a controlled flow of gas from the manifold. For example, the invention is applicable to the distribution of different gases and for utilization by process equipment other than dryers.

A specific control system configuration is set forth in FIG. 1 for the sake of illustration. FIG. 1 illustrates flows utilized in regenerating and cooling dryers 26 and 28. A compressor is illustrated feeding a fluid to a manifold which in turn feeds heated fuel gas through two sets of dryers and then further to a distribution network. The compressor also feeds cooled fuel gas through two sets of dryers and then to the distribution network. In addition, the cooled gas is fed directly to the distribution network. However, the invention is not limited by the number of dryers or the temperature of the gas being supplied to the dryers at any oen time. The invention anticipates that the number of dryers connected to the compressor at any one time depends on the needs of the processes being served and can therefore change at any time.

Further, the invention extends to different types of control system configurations which accomplish the purpose of the invention. Lines designated as signal lines in the drawing are electrical or pneumatic in this preferred embodiment. Generally, the signals provided for any transducer are electrical in form. However, the signals provided from flow sensors are generally pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However the use of any other type of signal transmission compatible with the process and equipment in use, is within the scope of the invention.

A digital computer is used in the preferred embodiment of this invention to calculate the required control signal based on measured process parameters as well as values for constants that are supplied to the computer. Analog computers or other types of computing devices could also be used in the invention. The digital computer is preferably an Optrol ® 7000 process computer system from Applied Automation, Inc., Bartlesville, Okla.

Signal lines are also utilized to represent the results of calculations carried out on a digital computer and the term "signal" is utilized to refer to such results. Thus the term signal is used not only to refer to electrical currents or pneumatic pressures but is also used to refer to binary representations of a calculated or measured value.

The controller shown may utilize the various modes of control such as proportional, proportional-integral, proportional-derivative, or proportional-integral-derivative. In this preferred embodiment proportional-integral controllers are utilized but any controller capable of accepting two input signals and producing a scaled output signal representative of a comparison of the two input signals, is within the scope of the invention.

The scaling of an output signal by a controller is well known in the control systems art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand the output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5 volts corresponds to 50 percent, some specified flow rate, or some specified temperature.

The various transducing means to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention utilizes a combination of pneumatic final control elements in conjunction with electrical analog signal handling and translation apparatus, the apparatus and method of the invention can be impleted using a variety of specific equipment available to and understood by those skilled in the process control art. Likewise, the format of various signals can be modified substantially in order to accomodate signal format requirements of the particular installation, safety factor, statistical characteristics of the measuring or control instruments and other similar factors. For example, a raw flow measurement signal produced by differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the parameter. Regardless of the signal format or the exact relationship of the signal to the parameter which it represents, each signal representative of a measured process parameter or representative of the desired process values will bear a direct relationship to the measured parameter or the desired value which permits designation of a specific measurement or desired value by specific signal value. A signal which is representative of a process measurement or desired process value is therefore one from which the information regarding the measured or desired value can be readily retrieved regardless of the exact mathematical relationship between the signal unit and the measuring or desired process units.

Referring now to the drawing there is illustrated a compressor 10 to which a fuel gas is supplied to the suction inlet 16 through conduit means 12. Power is supplied to the compressor 10 by a drive, not shown. The drive would typically be a steam turbine which maintained a constant rpm for compressor 10. Compressed fluid such as fuel gas, is provided from the discharge outlet 18 of compresor 10 through conduit means 14.

A portion of the fuel gas flowing in conduit means 14 is provided to steam heat exchanger 20 through conduit means 22 where the temperature of the fuel gas is increased to a temperature suitable for thermally desorbing the adsorbent beds in dryers 26 and 28. For dryers utilized in a hydrogen purification process a temperature of 420° F. is typical. After passing through heat exchanger 20 the heated fuel gas flowing in conduit means 24 is divided and separate streams of heated gas are passed through dryers 26 and 28. After passing through dryers 26 and 28 the streams are recombined and delivered to the fuel gas distribution network 30. Therefore a portion of the fluid flowing in conduit means 24, as determined by the set point 42 of flow controller 40 is supplied to dryer 26 through conduit means 32 and flow control valve 44. In dryer 26 the heated fuel gas desorbs the impurities in the bed and carries away the desorbed gases through the combination of conduits 36 and 38.

In a similar manner as illustrated in FIG. 1, the remaining portion of the heated gas flowing in conduit means 24 is passed through dryer 28 via the combination of conduit means 34, flow control valve 47 and conduit means 48. The flow rate of gas in conduit means 34 is controlled by flow controller 46. After passing through dryer 28 the heated fuel gas is provided to the distribution network 30 through conduit means 48, 50 and 38.

The remaining portion of the fuel gas flowing in conduit means 14 is provided to the air cooled heat exchanger 52 through conduit means 54 where the temperature of the fuel gas is reduced from about 250° F. to about 140° F. After passing through air cooled heat exchanger 52 the cooled fuel gas flowing in conduit means 56 is divided with one stream flowing through back pressure control valve 58 located in conduit means 38 to the distribution network 30. The other stream from the division of flow in conduit means 56 flows through heat exchanger 60 and conduit means 62. In heat exchanger 60 the fluid is cooled from about 140° F. to 100° F. by heat exchange with cooling water.

After passing through heat exchanger 60 the fluid flowing in conduit means 62 is again divided into two streams. One stream which flows through conduit means 64 and flow control valve 66, is recycled through the suction inlet 16 as a means of surge control. The other stream from the division of flow in conduit means 62 is passed via conduit means 68 to heat exchanger 70. In heat exchanger 70 the fuel gas is further cooled to a temperature of about 60° F. which is a suitable temperature for cooling the dryers 26 and 28 prior to returning the dryers to an onstream operation at the end of a regeneration cycle. After passing through heat exchanger 70 the fluid flowing in conduit means 68 is divided in separate streams of cool fuel gas and are passed through dryers 26 and 28. After passing through dryers 26 and 28 the streams of cool fuel gas are recombined and delivered to the fuel gas distribution network 30. Therefore a portion of the fluid flowing in conduit means 68 as determined by the set point 74 of flow controller 72, is supplied to the dryer 28 through conduit means 76 and flow control valve 78. In a similar manner the remaining portion of the cooled fuel gas flowing in conduit means 68 is supplied to the dryer 26 through conduit means 80 and flow control valve 82. The flow of cool fuel gas through conduit means 80 is maintained equal to the set point 94 of flow controller 49.

In accordance with the present invention a number of process measurements are utilized to derive the back pressure control signal which will be described hereinafter for controlling the gas distribution system. The process measurements are as follows:

Signal 102 which is provided from flow controller 46 as a control signal to control valve 47 which is operably located in conduit means 34 is representative of the position of the control valve 47 required to provide a flow rate of heated fluid as represented by set point signal 88. As previously stated, the flow rate of the heated fuel gas flowing through conduit means 34 is established by the requirements of the particular dryer which receives the heated fuel gas. This flow must satisfy the flow required for thermally desorbing the adsorbing bed 86 in dryer 28. The control valve 47 is manipulated in response to signal 102 so as to maintain the actual flow in conduit means 34, substantially equal to the desired flow represented by set point signal 88. The magnitude of signal 102 is considered to be representative of the actual position of control valve 47 even through the magnitude of signal 102 and the position of control valve 47 will differ during transient conditions. However, the error in the approximation is negligible during steady state conditions. In addition to being provided to control valve 47, signal 102 is provided from the flow controller 46 as in input to computer 100.

The flow rate of heated fuel gas to dryer 26 and the flow rate of cooled fuel gas to dryers 26 and 28 is manipulated in the same manner as previously described for the flow of heated fuel gas to dryer 28 by output signals 104, 106 and 108 from flow controllers 40, 49 and 72 respectively. Signal 104 is considered to be representative of the actual position of flow control valve 44 which is operably located in conduit means 32. Signal 106 is considered to be representative of the actual position of flow control valve 82 which is operably located in conduit means 80, and signal 108 is considered to be representative of the actual position of control valve 78 which is operably located in conduit means 76. Signals 104, 106 and 108 are also provided as input signals to computer 100.

Signal 110 which is provided from pressure controller 120 as a control signal to back pressure control valve 58 which is operably located in conduit means 38, is considered to be representative of the position of valve 58 required to maintain the actual pressure in conduit means 38 as represented by signal 112 substantially equal to the desired pressure represented by set point signal 140. As was previously stated in regard to signals 102, 104, 106 and 108, the magnitude of signal 110 and the actual position of control valve 58 can differ during transient conditions, however, any error is negligible during steady state conditions. Signal 112 is also supplied as an input signal to computer 100.

In response to the described input signals, computer 100 outputs a control signal 140. Control signal 140 is representative of the back pressure acting against compressor 10 that is required so that at least one of control valves 44, 47, 58, 78 and 82 will assume an open position which is equal to a desired high limit for open position. Signal 140 is provided from computer 100 as a set point input to pressure controller 120.

Pressure transducer 92 which is operbly located in conduit means 38, provides an output signal 112 which is representative of the actual pressure in conduit means 38. Signal 112 is provided as the process variable input to pressure controller 120. In response to signals 112 and 140 pressure controller 120 provides an output signal 110 which is responsive to the difference between signals 112 and 140. Signal 110 is scaled so as to be representative of the position of back pressure control valve 58 which is operably located in conduit means 38, required to maintain the actual pressure in conduit means 38 substantially equal to the pressure represented by signal 140. Signal 110, as previously stated, is provided from pressure controller 120 as a control signal for valve 58 and control valve 58 is manipulated in response thereto.

Before beginning a detailed description of the manner in which control signal 140 is generated it is noted that, in general, it is desirable to maintain each of control valves 44, 47, 78 and 82 in an 85% to 90% open position to minimize pressure drops accross these valves since any pressure drop across these valves increases the work done by compressor 10. However, since each of control valves 44, 47, 78, and 82 will generally require a different flow rate, a practical control system can only adjust the discharge outlet pressure until one of the valves reaches the high limit for open position. Typically, no valve will be maintained in a fully opened position since control movement in one direction is lost if a valve is fully opened.

From the view of energy conservation, reducing the back pressure acting against compressor 10 will correspondingly reduce the energy input required by compressor 10.

The control signal 140 is calculated in computer block 130 in response to computer operator entered signals 132, 134, 136 and 138 as well as previously described signals 102, 104, 106, 108 and 110. Referring now to computer block 130 in FIG. 1, signal 132 is a constant which is representative of the rate of increase/decrease for the back pressure acting against compressor 10. As will be illustrated hereafter, in a program listing, two values are entered for this constant which is utilized to compute the actual increment by which the back pressure is increased or decreased for each execution of the control program. Utilized in this manner the rate of increase of decrease is a tuning adjustment. Typically the initial value is set to about 40 psig/hr.

Signal 134 which is representative of the time period between successive executions of the floating pressure control program is also provided to computer block 130, and along with signal 132 is utilized to compute the actual increment by which the back pressure is increased or decreased for each execution of the control program. In addition, signal 136 which is representative of the high and low limits for control signal 140, and signal 138 which is representative of the high limit for open position are provided as inputs to computer block 130.

The manner in which control signal 140 is calculated is set forth in the program listing which follow. Symbols used in the listing are defined as follows:

X65423 = actual position of valve 44 (signal 104)
X65424 = actual position of valve 82 (signal 106)
X65427 = actual position of valve 47 (signal 102)
X65428 = actual position of valve 78 (signal 108)
X65630 = actual position of valve 58 (signal 110)
P5630S = calculated value for pressure set point (control signal 140)
P5630H = the high limit for the pressure set point (signal 130) (typically 110 psig)
P5630L = the low limit for the pressure set point (signal 136) (typically 90 psig)
LN = an array utilized in Fortran coding
LN1 = an array utilized in Fortran coding
LNX = total of LN
LNX1 = total of LN1
ISEC = time period between successive executions of program (signal 134)
FGDR1 = rate of pressure increase or decrease (signal 132)
FGDR2 = rate of pressure increase or decrease (signal 132)
VALHI = high limit for open position (signal 138) (typically 90%)

Other symbols set forth in the listing are either calculated in the listing or are standard FORTRAN symbols.

LISTING

1. LNX=0
2. LNX1=0
3. DO 10 I=1,5
4. LN1 (I)=0
5. 10 LN(I)=0
6. IF (X65423.GT. VALHI) LN(1)=1
7. IF (X65424.GT. VALHI) LN(2)=1
8. IF (X65427.GT. VALHI) LN(3)=1
9. IF (X65630.GT. VALHI) LN(4)=1
10. IF (X65630.GT. VALHI) LN(5)=1
11. IF (X65423.GT. 97.) LN1(1)=1
12. IF (X65424.GT. 97.) LN1(2)=1
13. IF (X65427.GT. 97.) LN1(3)=1
14. IF (X65428.GT. 97.) LN1(4)=1
15. IF (X65630.GT. 97.) LN1(5)=1
16. DO 20I=1,5
17. LNX1=LNX1+LN1 (I)
18. 20 LNX=LNX+LN(I)
19. STEP=ISEC* FGDR1/3600
20. STEP1=ISEC* FGDR2/3600
21. IF (LNX.GE.1) FGDR=STEP
22. IF (LNX1.GE.1) FGDR=STEP1
23. IF (LNX.LT.1) FGDR=-STEP
24. P5630S=P5630S+FGDR
25. IF (P5630S.GT.P5630H) P5630S=P5630H
26. IF (P5630S.LT.P5630L) P5630A=P5630L
27. ANALOG OUTPUT (P5630S)

Referring now to the listing, statements 1–5 initialize the arrays which the program utilizes to manipulate the date representing the positions of the five control valves. Statements 6–10 compare each valve position to a high limit for open position as represented by signal 138. Statements 11–15 compare each valve position to an open position of 97%.

Statements 16–18 totals the arrays LN and LN1 for utilization in statements 21–23.

The size of the incremetal pressure step is computed in steps 19–20. As previously mentioned the typical magnitude of the rate increase/decrease as represented for example by FGDR1 is 40 PSIG/hr. However, an operator enters two values for the constant so that a greater rate of increase in pressure is utilized if any valve is open to a position greater than 97%. Step 21 sets the magnitude of the incremental step to increase pressure equal to the small step calculated in statement 19 if any value of valve position is greater than high limit represented by signal 136. Step 22 then sets the the magnitude of the incremental step to increase pressure equal to the large step 1 calculated in statement 22 if any value of valve position is greater than 97%, and step 23 sets the magnitude of the incremetal step to decrease pressure equal to the small step computed in statement 19 if all of the valve positions are less than the high limit represented by signal 136. Step 24 increments the pressure set point according to the step determined in executing statements 21–23. Finally the control signal is compared to high and low limits in statements 25–26 and an analog output signal for P56305 is provided in statement 27.

In summary, the control system will reduce the discharge outlet pressure for compressor 10, while still maintaining adequate flow rates to the processes being served, until such time as a low limit on the pressure is reached, or a control valve reaches a maximum desired open position. This control action results in a substantial optimization of the compressor load while maintaining required flow rates of compressed fuel gas.

The invention has been described in terms of a preferred embodiment as illustrated in FIG. 1. Specific components which can be used in the practice of the invention such as flow controllers 40, 46, 49 and 72, pressure controller 120, pressure sensor 92 and control valves 44, 47, 58, 78 and 82 are each well known commercially available components such as described at length in Perry's Chemical Engineers Handbook, 4th Edition, Chapter 22, McGraw-Hill.

Additional equipment which would have been associated with the dryers such as means for providing a wet gas to be dryed, means for valve control to switch between on line operation and regeneration, additional measuring instruments and controllers to monitor the gas being dryed etc., have not been illustrated since these additional components play no part in the description of the present invention.

While the invention has been described in terms of the presently preferred embodiment, reasonable variations and modifications are possible by those skilled in the art and such modifications and variations are within the scope of the described invention and the appended claims.

That which is claimed is:

1. A method for controlling a gas distribution system for supplying gas to a plurality of process equipment and then transmitting said gas to a distribution network for consumable utilization therein, wherein the discharge outlet of a compressor simultaneously feeds a first line and a second line in parallel operations, and wherein a first portion of said gas from a discharge outlet of said compressor is passed through a first flow control valve and at least a first process equipment operably located in said first line wherein said flow rate of said first portion of said gas is manipulated in response to the demands of said first process equipment, and wherein a second portion of said gas from the discharge outlet of said compressor is passed through a back pressure control valve operably located in said second line so as to manipulate back pressure on the discharge outlet of said compressor, and wherein said first portion and said second portion are transmitted to said distribution network, said method comprising the steps of:

(a) establishing a first signal representative of the position of said first flow control valve;

(b) establishing a second signal representative of the position of said back pressure control valve;

(c) establishing a high limit signal representative of the desired maximum open position of said first flow control valve and said back pressure control valve;

(d) using computer means for comparing said first signal and said second signal to said high limit signal to determine if the position of both said first flow control valve and said back pressure control valve is less than the maximum open position represented by said high limit signal, and to determine if the open position of said first flow control valve or said back pressure control valve is greater than the maximum open position represented by said high limit signal;

(e) establishing a control signal representative of the desired back pressure acting against said compressor, wherein said control signal is periodically increased or decreased by a fixed increment depending on comparisons made in paragraph (d) so as to allow at least one of said flow control valve and said back pressure control valve to open to a position substantially equal to the open position represented by said high limit signal, thereby floating said back pressure acting against said compressor; and (f) manipulating the back pressure acting against said compressor in response to said control signal so as to maintain the actual back pressure substantially equal to the desired pressure as represented by said control signal.

2. Method in accordance with claim 1 wherein said step of manipulating the back pressure acting against said compressor in response to said control signal comprises;

establishing a third signal representative of the actual back pressure provided by said second line acting against the discharge outlet of said compressor;

comparing said third signal and said control signal to establish said second signal which is responsive to the difference between said third signal and said control signal, wherein said second signal is scaled so as to be representative of the position of said back pressure control valve required to maintain the actual back pressure substantially equal to the pressure represented by said control signal; and manipulating said back pressure control valve in response to said second signal.

3. Method in accordance with claim 1 wherein the magnitude of said control signal is periodically increased by a first increment if the open position of said first flow control valve or said back pressure control valve is greater than the open position represented by said high limit signal, and wherein the magnitude of said control signal is periodically increased by a second increment, which is larger than said first increment, if the open position of said first control valve or said back pressure control valve is greater than 97% open.

4. Method in accordance with claim 1 wherein the magnitude of said control signal is decreased by said first increment if the open position of said first flow control valve and the open position of said back pressure control valve are both less open than the open position represented by said high limit signal.

5. Method in accordance with claim 4 additionally comprising:

establishing in said computer means a first and a second rate signal representative of the desired rate of change for said back pressure acting against said compressor;

establishing a period signal which is representative of the actual time period between consecutive executions of a floating pressure control program for establishing said control signal; and multiplying said period signal by said first pressure rate signal to establish said first increment and for multiplying said period signal by said second pressure rate signal to establish said second increment.

6. Method in accordance with claim 1 wherein said fixed increment for increasing or decreasing said control signal is based on comparison of said first signal, said second signal and a fourth signal to said high limit signal, method additionally comprising the steps of:

flowing a third portion of said gas from the discharge outlet of said compressor through said third line to at least a second process equipment and then transmitting said third portion to said distribution network;

manipulating the flow in said third line, wherein the flow rate in said third line responds to the demands of said second process equipment; and establishing said fourth signal representative of the position of said second flow control valve; and providing said fourth signal to said computer means for comparing said fourth signal with said high limit signal to determine if the open position of said second flow control valve is greater than or less than the open position represented by said high limit signal.

7. A method in accordance with claim 6 wherein said third portion of said gas from the discharge outlet of said compressor flowing through said third line is cooled prior to passage through an adsorbent bed of a dryer.

8. A method in accordance with claim 1 wherein said first portion of said gas from the discharge outlet of said compressor flowing in said first line is heated to a temperature suitable for regenerating an adsorbent bed of material.

9. Apparatus comprising:
(a) a compressor having a suction inlet and a discharge outlet;
(b) means for supplying a gas to the suction inlet of said compressor;
(c) means for flowing a first portion of said gas from the discharge outlet of said compressor through a first line to a first process equipment and from said first process equipment to a distribution network and for flowing a second portion of said gas from the discharge outlet of said compressor through a second line to said distribution network;
(d) a first flow control valve operable located in said first line so as to manipulate the flow of said first portion of said gas, wherein the flow rate of said first portion is manipulated in response to the demands of said first process equipment;
(e) a back pressure control valve operably located in said second line so as to manipulate the pressure in said second line, wherein the pressure in said second line provides a back pressure acting against the discharge outlet of said compressor;
(f) means for establishing a first signal representative of the actual position of said first flow control valve;
(g) means for establishing a second signal representative of the actual position of said back pressure control valve;
(h) computer means;
(i) means for establishing in said computer means a high limit signal representative of the maximum desired open position of said first flow control valve and said back pressure control valve;
(j) means for providing said first signal and said second signal to said computer means, and for comparing said first signal and said second signal to said high limit signal to determine the relationship of the position of said first flow control valve and the position of said back pressure control valve to said high limit signal;
(k) means for establishing a control signal representative of the desired back pressure acting against said compressor, wherein said control signal is periodically increased or decreased by a fixed increment depending on the comparisons made in paragraph (j) so as to allow at least one of said first flow control valve and said back pressure control valve to open to a position substantially equal to the open position represented by said high limit signal, thereby floating the back pressure acting against said compressor; and
(l) means for manipulating the back pressure acting against said compressor in response to said control signal so as to maintain the actual back pressure substantially equal to the desired back pressure as represented by said control signal.

10. Apparatus in accordance with claim 9 wherein said means for manipulating the back pressure acting against said compressor in response to said control signal comprises:
means for establishing a third signal representative of the actual back pressure acting against the discharge outlet of said compressor;
means for comparing said third signal and said control signal to establish said second signal which is responsive to the difference between said third signal and said control signal, wherein said second signal is scaled so as to be representative of the position of said back pressure control valve required to maintain the actual back pressure substantially equal to the pressure represented by said control signal; and
means for manipulating said back pressure control valve in response to said second signal.

11. Apparatus in accordance with claim 9 wherein the magnitude of said control signal is periodically increased by a first increment if the open position of said first flow control valve or said back pressure control valve is greater than the open position represented by said high limit signal, and wherein the magnitude of said control signal is periodically increased by a second increment, which is larger than said first increment, if the open position of said first control valve or said back pressure control valve is greater than 97% open.

12. Apparatus in accordance with claim 11 wherein the magnitude of said control signal is periodically decreased by said first increment if the open position of said first flow control valve and the open position of said back pressure control valve are less open than the open position represented by said high limit signal.

13. Apparatus in accordance with claim 12 additionally comprising:
means for establishing in said computer means a first and a second pressure rate signal representative of the desired rate of change for said back pressure acting against said compressor;
means for estblishing in said computer means a period signal which is representative of the actual time period between consecutive executions of a floating pressure control program for establishing said control signal; and
means for multiplying said period signal by said first pressure rate signal to establish said first increment and for multiplying said period signal by said second pressure rate signal to establish said second increment.

14. Apparatus in accordance with claim 9 wherein said fixed increment for increasing or decreasing said control signal is based on comparison of said first signal and said second signal and a fourth signal to said high limit signal, apparatus additionally comprising:
means for flowing a third portion of said gas from the discharge outlet of said compressor through a third line to a second process equipment and from said second process equipment to said distribution network;
a second flow control valve operably located in said third line so as to manipulate the flow of said third portion of said gas, wherein the flow rate of said third portion of said gas is manipulated in response to the demands of said second process equipment;

means for establishing said forth signal representative of the position of said third flow control valve; and means for providing said fourth signal to said computer means and for comparing said fourth signal with said high limit signal to determine if the open position of said second flow control valve is greater than or less than the open position represented by said high limit signal.

15. Apparatus in accordance with claim 14 wherein said second process equipment in addition to said second flow control valve comprises:

a cooling means for cooling said third portion of said gas; and a dryer having at least a bed of adsorbent material.

16. Apparatus in accordance with claim 9 wherein said first process equipment in addition to said first flow control valve comprises:

a heating means for heating said first portion of said gas from the discharge outlet of said compressor; and a dryer having at least a bed of adsorbent material.

17. Apparatus in accordance with claim 9 additionally comprising a cooling means operably located in said second line for cooling said second portion of said gas from the discharge outlet of said compressor.

* * * * *